Figure 1:
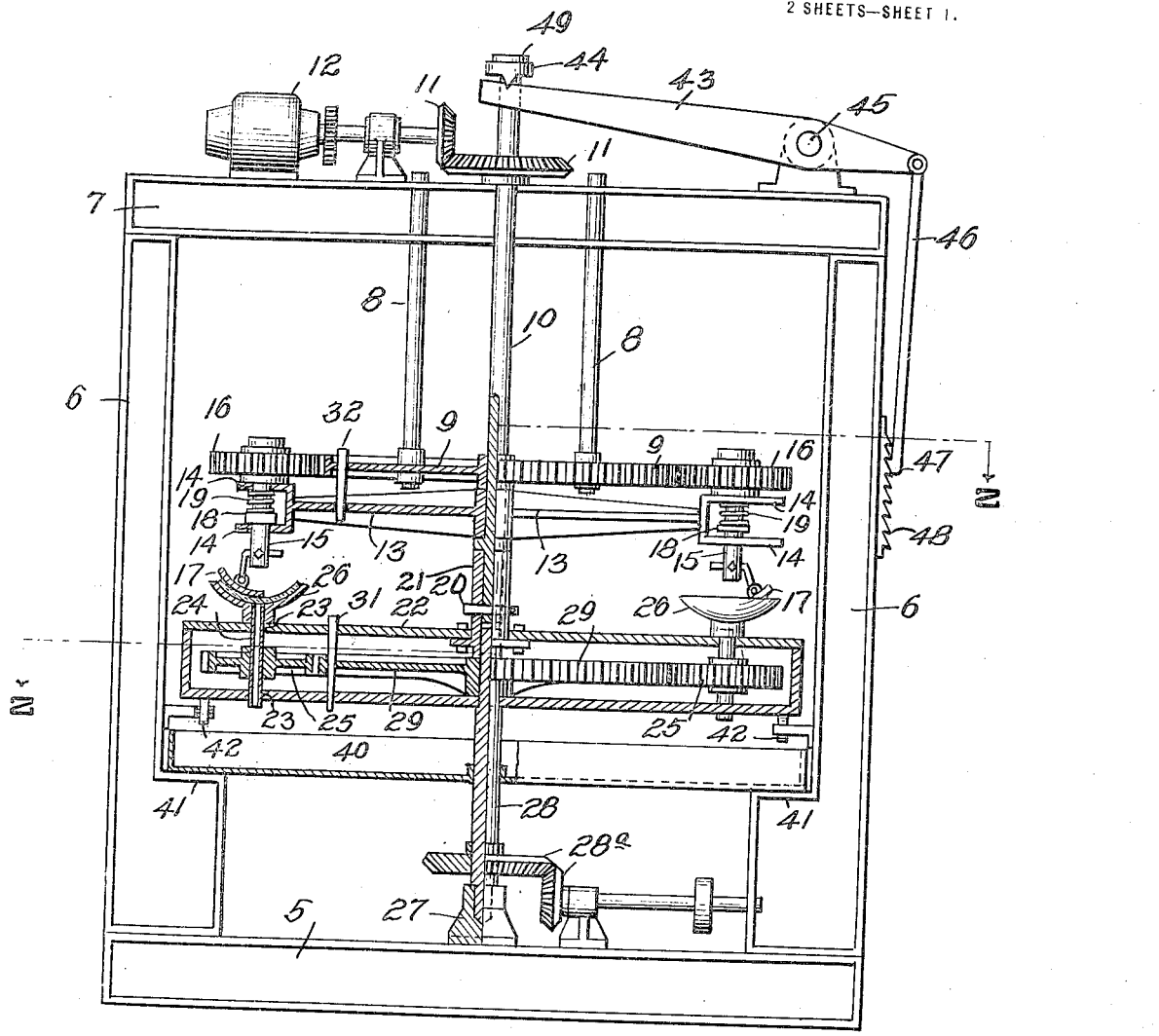

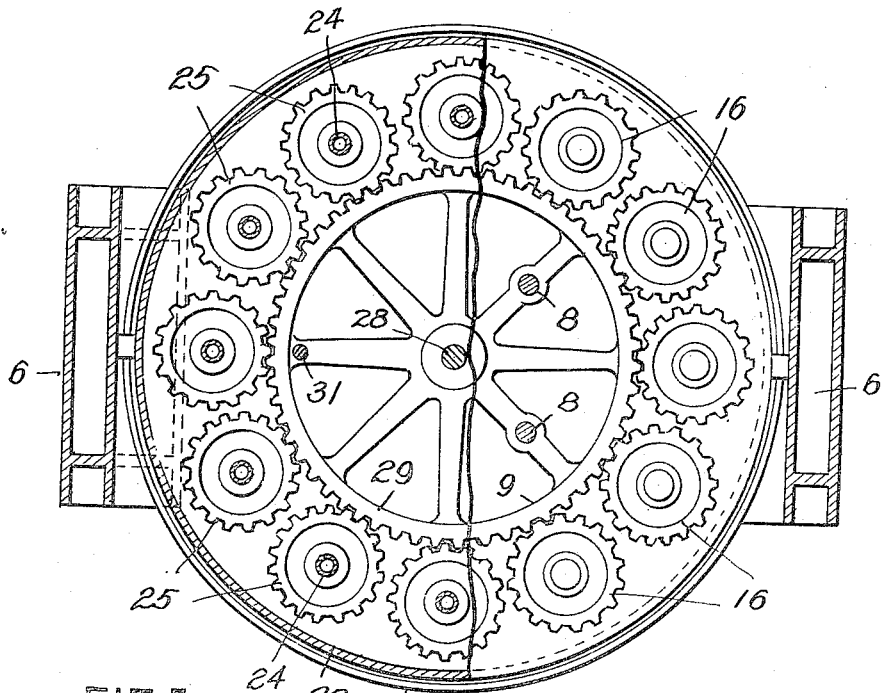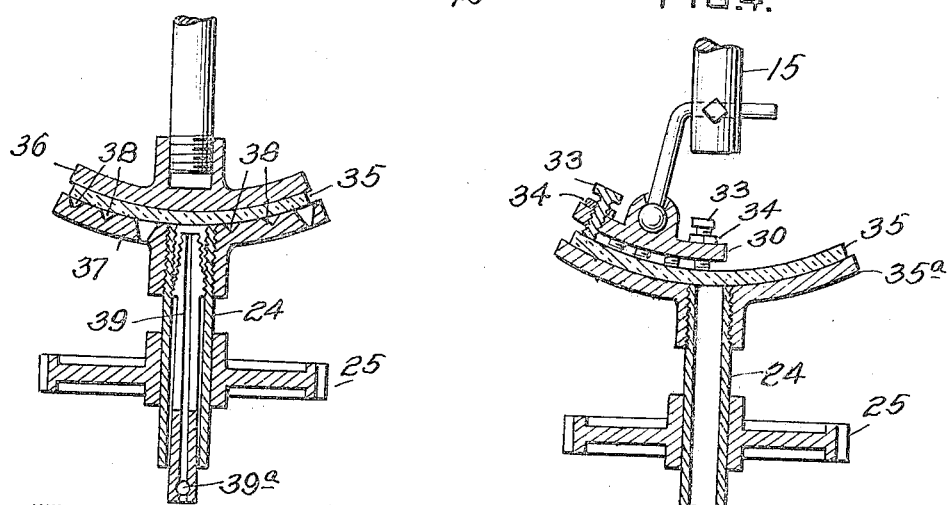

A. J. DE WILLE.
LENS GRINDING MACHINE.
APPLICATION FILED APR. 21, 1919.

1,427,787.

Patented Sept. 5, 1922.
2 SHEETS—SHEET 1.

Patented Sept. 5, 1922.

1,427,787

UNITED STATES PATENT OFFICE.

ANTHONY JOSEPH DE WILLE, OF SUTERSVILLE, PENNSYLVANIA.

LENS-GRINDING MACHINE.

Application filed April 21, 1919. Serial No. 291,657.

*To all whom it may concern:*

Be it known that I, ANTHONY JOSEPH DE WILLE, a citizen of Belgium, and a resident of Sutersville, in the county of Westmoreland and State of Pennsylvania, have made a new and useful Invention in Lens-Grinding Machines, of which the following is a specification.

My invention is a machine for grinding, smoothing and polishing a plurality of lenses, which is simple of construction, easily attended and wherein all work is under constant supervision of an operator. Other advantages appear in the description and in the drawings forming part of this specification.

In the drawings Figure 1 is a view and in part a section through the center of my machine; Fig. 2 is a horizontal section on line 2—2 of Fig. 1; Fig. 3 is an enlarged section through the spindles which carry the lenses and tools operating on the same and Fig. 4 is a similar section showing other tools of the spindles.

The frame of my machine consists of a base 5 rectangular or circular in shape, sides 6 and top 7. Depending from the top 7 are several fixed shafts 8 and mounted thereon is a circular spider 9 having spur gear teeth on its circumference.

Journaled in the top 7 and the spider 9 is a vertical shaft 10 which is driven by bevel gears 11 run by a motor 12 mounted on the frame. Keyed to the shaft 10 is an upper spindle wheel 13 provided about its circumference with a plurality of bearings 14 in vertical pairs, in each pair of which is journaled a spindle 15 having a pinion 16 keyed to its upper end and meshing with the teeth on the spider rim 9. On the lower end of the spindle 15 is a grinding, smoothing or polishing tool 17 such as shown in the drawings or of any other convenient form. A collar 18 on the spindle 15 limits the latter's downward movement while its upward movement is yieldingly prevented by a coil spring 19. Secured to the lower end of the shaft 10 by a pin 20 is a sleeve 21. Fixedly mounted on this sleeve is a lower spindle wheel 22 provided about its circumference with a plurality of bearings 23 in vertical pairs, in each pair of which is journaled a hollow spindle 24. Keyed to the spindle 24 is a pinion 25 and mounted on its upper end is a tool 26 cooperating with the tool 17 on the upper spindle. The spindles 15 and 24 are in alignment and, of course, are equal in number.

In the center of the base 5 is a journal 27 and mounted therein and in the sleeve 21 is a lower vertical shaft 28 which may be driven by bevel gears 28ª run by a motor similar to the motor 12 but not shown. Keyed to the shaft 28 is a gear 29 meshing with the pinions 25. A taper pin 20 prevents relative rotation between the sleeve 21 and the shaft 10 and consequently between the lower spindle wheel 22 and the upper spindle wheel 13. The pin 20 is only removed when the machine is stationary and it is desired to raise the spindle wheel 13 with all of its depending tools from juxtaposition with the cooperating tools on the spindle wheel 22. A pin 31 may be inserted through the wheel 22 and the gear 29 to prevent their relative rotation. Another pin 32, if inserted as shown, will prevent rotation of the wheel 13 and, by means of the locked sleeve 21 and the shaft 10 will also prevent the rotation of the wheel 22. The use of these pins enable me to secure the rotation of the laps and the holders as described below.

Operation: The rotation of the shaft 10, in either direction, revolves the pinions 16 and 25 about the machine center or common axis. The teeth on the spider 9 will rotate the pinions 16 on their respective axes. If the pin 31 is in place the gear 29 and the shaft 28 will rotate with the wheel 22 and the spindles 24 will not rotate about their axes although they will revolve around their common center. By removing the pin 31 and by rotating the shaft 28 in the opposite direction from the shaft 10, the gear 29 will rotate the pinions 24 causing greater relative rotation between the cooperating tools. If the pin 32 be inserted, as shown, the spindle wheels 13 and 32 cannot rotate and if the shaft 28 be rotated the lower spindles will be rotated while the upper ones are fixed. With this operation there is no revolution about the common center and an operator may confine his attention to a single lens. During the previously described operations the tools pass a given point in succession and may easily be inspected for lubrication, lapping material, finished sizes, etc.

While the lapping tools used may be of any type for grinding, smoothing or polishing, I show one improved form in the upper lap, best illustrated in Fig. 4. The body of the tool 30 is drilled and tapped in a number of irregularly located spots and into each of these tapped holes a flat pointed screw 33 is inserted until its point extends beyond the body surface. A lock nut 34 is then tightened against the body to maintain the screw in adjusted position. The points of the screws 33 constitute the lapping surfaces which, when worn, may be removed and replaced or resharpened without removing the whole tool from the machine. By adjusting these lapping screws the curvature may be maintained while wear on an ordinary lap necessitates new laps or reshaping. The tool 30 is eccentrically mounted on the spindle 15 by means of a ball and socket joint which, with yielding pressure due to spring 19, gives a very flexible but constant contact with the surface of the lens 35 which is cemented to the holder 35ᵃ carried by the spindle 24.

In Fig. 3 I show the holder 36 and the lens 35 mounted upon the upper spindle and with a lap 37 mounted on the lower spindle. This lap operates on the entire surface of the lens and is novel in the feature of having small conical depressions 38 provided in its face which are adapted to be filled with a lapping material which will be drawn out as needed. Surplus material will drain through the hollow spindle 24. In order to regulate this drainage, I thread the spindle 24 internally and insert a plug 39 having a central aperture extending throughout its entire length. A plug 39 is split into quarters for a substantial part of its length, and is provided with a tapered external thread at the split end and a transverse hole 39ᵃ, as shown, or a square shoulder at the opposite end whereby it may be screwed in or out of the spindle 24. It is apparent that the plug 39 may be compressed by forcing the split tapered portions together until the opening is as small as desired.

The surplus lapping material drains into a pan 40 supported on projections 41 provided on the frame 6. On the frame 6 are mounted rollers 42 which support the spindle wheel 22.

Reference has been made to the removal of the pin 20 and the raising of the wheel 13 and its spindles. These parts may be held in any desired position by means of a lever 43 and a collar 44 which engages a shoulder 49 on the shaft 10. The lever 43 pivots on a fulcrum 45 and is secured by a rod 46 which terminates in a hook 47 adapted to engage teeth 48 on the side 6 of the frame.

While I have only illustrated a concavo-convex lens in my drawings it is obvious that other types may be worked by substituting proper tools without necessitating other changes in my machine. Various changes also may be made in the lapping or polishing tools such as depressions of rectangular or ring shape instead of as shown.

I claim:

1. A lens grinding machine comprising a plurality of lens holders rotatively mounted on individual axes and revolvingly mounted about a common axis, an equal plurality of laps rotatively mounted on individual axes and revolvingly mounted about said common axis, each of said laps being located in cooperative position relative to a respective holder, means adapted to rotate said holders about their individual axes, and means adapted to similarly rotate said laps about their individual axes, and to revolve said holders and laps about said common axis.

2. A lens grinding machine comprising, a plurality of lens holders, a plurality of lap members co-operating therewith, means for revolving said holders and said lap members around a common center, means for rotating said holders and said laps upon their respective axes and means for locking said holders and said laps against revolution and rotation.

3. A lens grinding machine comprising a plurality of lens holders rotatively mounted upon respective axes and revolvingly mounted about a common axis, respective laps aligned with said holders and revolvingly mounted about said common axis, means rotating each of said holders on its individual axis, means revolving said holders and laps about said common axis and means maintaining alignment of respective holders and laps.

4. The combination in a lens grinding machine of a plurality of lens holders rotatively mounted upon individual axes and spaced circularly about the machine center, respective laps alined with said holders and similarly spaced and means adapted to rotate said holders on their individual axes, said holders and laps being so mounted that any holder, while rotating, and its respective lap may be revolved to any desired point about the machine center.

5. In a lens grinding machine, a vertical lower shaft, a vertical upper shaft alined therewith, independent driving means for each of said shafts, spaced spindle wheels fixedly mounted on said upper shaft, a plurality of spindles mounted on the circumference of each of said wheels, each spindle on one wheel being alined with a corresponding spindle on the other wheel, cooperating lens holders and laps mounted on said alined spindles and means for providing relative rotation of said spindles when either of said shafts is rotated.

6. In a lens grinding machine, a main shaft, spaced spindle wheels mounted thereon, lap holding spindles and lens holding spindles journaled respectively in said wheels, integral pinions on each of said spindles, a fixed gear meshing with all of the pinions on said lap holding spindles, a supplementary shaft, a rotatable gear fixed thereon and meshing with all of the pinions on said lens holding spindles and independent driving mechanisms for said shafts.

7. A lens grinding machine comprising, a plurality of lens holders, a plurality of lap members co-operating therewith, means for revolving said holders and said lap members around a common center, means for rotating said holders and said laps upon their respective axes and means for locking said laps against revolution and rotation.

8. A lens grinding machine comprising, a plurality of lens holders, a plurality of lap members co-operating therewith, means for revolving said holders and said lap members around a common center, means for rotating said holders and said laps upon their respective axes and means for locking said holders against rotation.

9. A lens grinding machine comprising, a plurality of lens holders, a plurality of lap members co-operating therewith, means for revolving said holders and said lap members around a common center, means for rotating said holders and said laps upon their respective axes and means for locking said laps against revolution and rotation and said holders against revolution.

10. A lens grinding machine comprising a lens holder, a shaft, a lap carried thereby and co-operating with said holder, means for simultaneously moving said holder and said lap in parallel planes, means for causing the rotation of said holder, means for rotating said shaft and lap about the longitudinal axes thereof and means for locking said holder and said lap against movement within their respective planes.

11. A lens grinding machine comprising a lens holder, a lap co-operating therewith, means for moving said holder and said lap in parallel planes, means for rotating said lap upon its axis, and independent means for rotating said holder in a direction opposite to the direction of rotation of said lap.

12. A lens grinding machine comprising a lens holder, a lap co-operating therewith, means for moving said holder and said lap in parallel planes, means for rotating said lap upon its axis, independent means for rotating said holder upon its axis, and means for locking said holder and said lap against movement within their respective planes.

13. A lens grinding machine comprising a lens holder, a lap co-operating therewith, means for moving said holder and said lap in parallel planes, means for rotating said lap upon its axis, independent means for rotating said holder upon its axis, and means for locking said holder and said lap against movement within their respective planes and said lap against rotation upon its axis.

14. A lens grinding machine comprising a lens holder, a lap co-operating therewith, means for moving said holder and said lap in parallel planes, means for rotating said lap upon its axes, independent means for rotating said holder upon its axis, and means for selectively locking said holder and said lap against rotation.

15. A lens grinding machine comprising, a lens holder, a lap member co-operating therewith, planetary gear mechanism for rotating said holder and said lap upon their axes, and means for moving said holder and said lap member in directions transverse to the axis of rotation thereof.

16. A lens grinding machine comprising, a rotatable lens holding member, a rotatable lap member co-operating therewith, means for revolving said holding member and said lap member in directions transverse to the axis of rotation thereof and means for moving one of said members away from the other.

In testimony whereof, I have hereunto subscribed my name this 11th day of March, 1919.

ANTHONY JOSEPH DE WILLE.